(12) United States Patent
Ambroladze et al.

(10) Patent No.: US 10,402,328 B2
(45) Date of Patent: Sep. 3, 2019

(54) CONFIGURATION BASED CACHE COHERENCY PROTOCOL SELECTION

(71) Applicant: International Business Machines Corporation, Armonk, NY (US)

(72) Inventors: Ekaterina M Ambroladze, Wappingers Falls, NY (US); Deanna P Berger, Poughkeepsie, NY (US); Michael F Fee, Cold Spring, NY (US); Arthur J O'Neill, Poughkeepsie, NY (US); Robert J Sonnelitter, III, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/860,283

(22) Filed: Jan. 2, 2018

(65) Prior Publication Data
US 2018/0121358 A1    May 3, 2018

Related U.S. Application Data

(63) Continuation of application No. 14/548,988, filed on Nov. 20, 2014, now Pat. No. 9,886,382.

(51) Int. Cl.
*G06F 12/0815* (2016.01)
*G06F 12/084* (2016.01)
(Continued)

(52) U.S. Cl.
CPC ........ *G06F 12/0815* (2013.01); *G06F 12/084* (2013.01); *G06F 12/0817* (2013.01); *G06F 12/0831* (2013.01); *G06F 15/173* (2013.01); *G06F 2212/1016* (2013.01); *G06F 2212/1032* (2013.01); *G06F 2212/314* (2013.01); *G06F 2212/60* (2013.01); *G06F 2212/601* (2013.01); *G06F 2212/622* (2013.01)

(58) Field of Classification Search
None
See application file for complete search history.

(56) References Cited

U.S. PATENT DOCUMENTS 5,752,264 A * 5/1998 Blake .................. G06F 12/0811
                                                        711/122
5,895,487 A    4/1999 Boyd et al.
(Continued)

FOREIGN PATENT DOCUMENTS

DE   11 2015004336 T5   6/2017
DE       20151104336    6/2017

OTHER PUBLICATIONS

Disclosed anonymously(2003), Method for instruction cache coherence on a processor with disjoint level-2 caches. IPCOM000010890D All 5 pages.

(Continued)

*Primary Examiner* — Reginald G Bragdon
*Assistant Examiner* — James J. Thomas
(74) *Attorney, Agent, or Firm* — John E. Campbell; William Kinnaman, Jr.

(57) ABSTRACT

Topology of clusters of processors of a computer configuration, configured to support any of a plurality of cache coherency protocols, is discovered at initialization time to determine which one of the plurality of cache coherency protocols is to be used to handle coherency requests of the configuration.

20 Claims, 10 Drawing Sheets

(51) Int. Cl.
*G06F 12/0817* (2016.01)
*G06F 12/0831* (2016.01)
*G06F 15/173* (2006.01)

(56) References Cited

U.S. PATENT DOCUMENTS

| | | | |
|---|---|---|---|
| 6,192,451 B1* | 2/2001 | Arimilli | G06F 12/0831 |
| | | | 711/122 |
| 6,330,643 B1 | 12/2001 | Arimilli | |
| 6,510,496 B1 | 1/2003 | Tarui et al. | |
| 6,918,012 B2 | 7/2005 | Venkitakrishnan et al. | |
| 6,988,173 B2 | 1/2006 | Blake et al. | |
| 7,076,597 B2 | 7/2006 | Webb et al. | |
| 7,085,895 B2 | 8/2006 | Blake et al. | |
| 7,272,688 B1* | 9/2007 | Glasco | G06F 12/0808 |
| | | | 711/141 |
| 7,360,033 B2 | 4/2008 | Hum et al. | |
| 7,389,389 B2 | 6/2008 | Gharachorloo et al. | |
| 7,434,006 B2 | 10/2008 | Beers et al. | |
| 7,669,013 B2 | 2/2010 | Carpenter et al. | |
| 7,802,058 B1 | 9/2010 | Jordan | |
| 7,904,676 B2 | 3/2011 | Hornung et al. | |
| 7,925,857 B2 | 4/2011 | Averill et al. | |
| 8,010,716 B2 | 8/2011 | Yamazaki et al. | |
| 8,055,847 B2 | 11/2011 | Cantin, Jr. | |
| 8,135,916 B1 | 3/2012 | O'Bleness et al. | |
| 8,539,164 B2 | 9/2013 | Warner et al. | |
| 8,990,501 B1* | 3/2015 | Sellers | G06F 12/0811 |
| | | | 711/121 |
| 2005/0018665 A1 | 1/2005 | Jordan | |
| 2005/0216637 A1 | 9/2005 | Smith et al. | |
| 2005/0240734 A1 | 10/2005 | Batson et al. | |
| 2006/0176885 A1* | 8/2006 | Goodman | G06F 12/0831 |
| | | | 370/401 |
| 2006/0179244 A1* | 8/2006 | Goodman | G06F 12/0817 |
| | | | 711/141 |
| 2007/0022252 A1 | 1/2007 | Cen | |
| 2007/0022256 A1* | 1/2007 | Cantin | G06F 12/0831 |
| | | | 711/144 |
| 2007/0061519 A1* | 3/2007 | Barrett | G06F 12/0817 |
| | | | 711/141 |
| 2008/0155145 A1 | 6/2008 | Stenfort | |
| 2009/0193194 A1* | 7/2009 | Drapala | G06F 12/0831 |
| | | | 711/132 |
| 2011/0016277 A1 | 1/2011 | Miller et al. | |
| 2012/0005439 A1 | 1/2012 | Ukai | |
| 2013/0042070 A1 | 1/2013 | Jalal et al. | |
| 2013/0060986 A1* | 3/2013 | Amann | G06F 13/00 |
| | | | 710/306 |
| 2015/0242318 A1* | 8/2015 | Bernard | G06F 12/0813 |
| | | | 711/130 |
| 2016/0147658 A1 | 5/2016 | Ambroladze et al. | |
| 2016/0147659 A1 | 5/2016 | Drapala et al. | |
| 2016/0147661 A1 | 5/2016 | Ambroladze et al. | |
| 2016/0147662 A1 | 5/2016 | Drapala et al. | |
| 2017/0228317 A1 | 8/2017 | Drapala et al. | |
| 2018/0121359 A1 | 5/2018 | Ambroladze et al. | |

OTHER PUBLICATIONS

Nowatzyk et al. The s3.mp scalable shared memory mutiprocessor, 1994. p. 144-153, Proceedings of the Twenty-Seventh Annual Hawaii International Conference on System Sciences, IEEE. Website: <http://ieeexplore.ieee.org/stamp/stamp.jsp?arnumber=323149>.

List of IBM Patents or Patent Applications Treated As Related, 2 pages, Jan. 2, 2018.

Disclosed anonymously(May 2005). Various Configurations of Chip Multiprocessor(CMP), System on a Chip(SOC) and Multi-core(MC) Integration. IPCOM000124954D, All 26 Pages.

* cited by examiner

CONFIGURATION BASED CACHE COHERENCY PROTOCOL SELECTION

FIELD OF THE INVENTION

The present invention is related to computer systems and more particularly to dynamically selecting cache coherency protocols of multi-processor systems.

BACKGROUND

Modern computer packaging technology provides for a modular design that may be used in a variety of computer system products in conjunction with a computer memory. In one example, multiple processor cores may be packaged on a single module or chip die. In another example, multiple chip cores may be packaged with storage control function on a single module or chip die. In an embodiment, the multiple processor cores employ a cache hierarchy on the module or chip die. In one embodiment, only a single core of the module or chip die may be used in a computer system. In one embodiment, only a single such module or chip die may be used in a computer system. In one embodiment, multiple such modules or chip dies may be used in a computer system. Each embodiment may require a different cache coherency protocol to efficiently perform desired function and achieve desired performance.

U.S. Pat. No. 8,423,736 "MAINTAINING CACHE COHERENCE IN A MULTI-NODE, SYMMETRIC MULTIPROCESSING COMPUTER", filed 2010 Jun. 16 and incorporated by reference herein, teaches "Maintaining cache coherence in a multi-node, symmetric multiprocessing computer, the computer composed of a plurality of compute nodes, including, broadcasting upon a cache miss by a first compute node a request for a cache line; transmitting from each of the other compute nodes to all other nodes the state of the cache line on that node, including transmitting from any compute node having a correct copy to the first node the correct copy of the cache line; and updating by each node the state of the cache line in each node, in dependence upon one or more of the states of the cache line in all the nodes."

U.S. Pat. No. 8,402,225 "METHOD FOR PERFORMING CACHE COHERENCY IN A COMPUTER SYSTEM", filed 2010 Sep. 21 and incorporated by reference herein, teaches "in a computing system, cache coherency is performed by selecting one of a plurality of coherency protocols for a first memory transaction. Each of the plurality of coherency protocols has a unique set of cache states that may be applied to cached data for the first memory transaction. Cache coherency is performed on appropriate caches in the computing system by applying the set of cache states of the selected one of the plurality of coherency protocols."

U.S. Pat. No. 8,010,716 "METHODS AND APPARATUS FOR SUPPORTING MULTIPLE CONFIGURATIONS IN A MULTI-PROCESSOR SYSTEM", filed 2010 Aug. 18 and incorporated by reference herein, teaches "methods and apparatus provide for interconnecting one or more multi-processors and one or more external devices through one or more configurable interface circuits, which are adapted for operation in: (i) a first mode to provide a coherent symmetric interface; or (ii) a second mode to provide a non-coherent interface.

U.S. Pat. No. 7,546,422 "Method and Apparatus for the Synchronization of Distributed Caches" filed 2002 Aug. 28, incorporated herein by reference in its entirety, teaches a hierarchical caching protocol suitable for use with distributed caches, including use within a caching input/output hub.

SUMMARY

The shortcomings of the prior art are overcome and additional advantages are provided through the provision of a mechanism to detect topology of a computer system and, based on the topology instantiate a selected cache coherency protocol of a plurality of coherency protocols available.

In an embodiment, one of a plurality of cache coherency protocols is selected and performed in a computer system comprising a first node of a configuration comprising one or more communicatively coupled nodes, each node comprising one or more communicatively coupled computer elements, each computer element consisting of at least one of a cluster or a storage controller (SC) function, each cluster comprising one or more processors, the SC function comprising a shared cache, the shared cache being shared by processors of each cluster, the method comprising: initiating communication, by each element of the configuration, to other elements of the configuration to determine configuration topology; based on a result of the initiated communication, storing a coherency value by each element; based on the coherency value, determining, by elements of the node, a cache coherency protocol of the plurality of cache coherency protocols to be used by the node; and using the determined cache coherency protocol to handle cache coherency requests.

In an embodiment, the configuration topology consists of the first node, wherein the plurality of cache coherency protocols comprise a first protocol that does not use an SC function to maintain cache coherency of the first node and a second protocol that uses an SC function to maintain cache coherency of the first node.

In an embodiment, the configuration topology consists of the first node, the using of the selected cache coherency protocol further comprising accessing an inclusive directory of the SC function of the first node to handle the cache coherency requests.

In an embodiment, the configuration topology further comprises one or more second nodes, the first node communicatively coupled to said one or more second nodes, the using the selected cache coherency protocol further comprises: accessing, by the first node, an inclusive directory of the SC function of the first node to handle the cache coherency requests; based on determining, by the first node, that the cache coherency operation can be performed solely by the first node, performing the cache coherency operation, by the first node, without accessing caches of the one or more second nodes; and based on determining, by the first node, that the cache coherency operation must access said one or more second nodes, performing the cache coherency operation by accessing caches of said one or more second nodes.

In an embodiment, the plurality of cache coherency protocols comprise a third protocol and a fourth protocol for maintaining cache coherency of the node wherein the third protocol is the MESI protocol and the fourth protocol is the MOESI protocol.

In an embodiment, the configuration topology further comprises one or more second nodes, the first node communicatively coupled to said one or more second nodes, wherein the SC function of the first node determines that one of the first protocol and second protocol is to be used in local cache coherency operations within the first node and that a different one of the first protocol and second protocol is to be used in global cache coherency operations involving said one or more second nodes.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
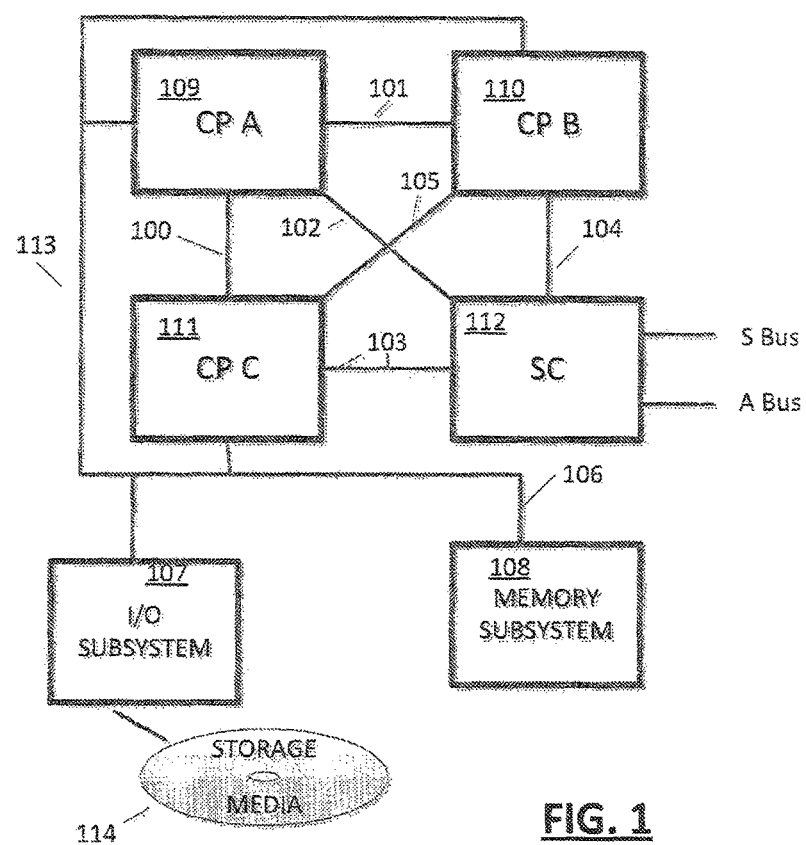
FIG. 1 illustrates one example of components of a node.

The detailed description explains the preferred embodiments of the invention, together with advantages and features, by way of example with reference to the drawings.

DETAILED DESCRIPTION

In modern multi-processor computer systems, a hierarchy of caches is used to buffer memory cache lines in order to reduce the access time overhead of data in memory. In order to give all processors, access to cached data, a coherency mechanism is employed to assure that one processor's cached value is coherent. For example, if multiple processors had the ability to modify the same cache line at the same time, neither one would be assured that its copy was correct. Thus, the coherency mechanism gives all processors a cached view of memory that would be consistent were there no cache at all, only a single main store. Such cache coherency is provided in an SMP (Symmetric multi-processor) computer system. There are many possible protocols that can be used to perform cache coherency in a large SMP system. Depending on the SMP structure and system configuration, some protocols may be better tailored than others with regards to bus utilization and system performance. Different SMP structures may also be better suited for different system packaging or customer capacity requirements.

Processor CLUSTER

In embodiments (FIG. 5), a "cluster" 500 of one or more processing units 501 to 506 (comprising one or more processor cores on a chip die for example) is the building block of different system structures. Each cluster may include a hierarchy of caches, for example local (level 1) caches (L1/L2) associated with respective processing units 501 to 506, and a cluster shared cache (L3), shared by all processing units 501 to 506 of the cluster. Each cache system of a cluster may be configurable to manage coherency within the cluster 500, or to participate with other clusters of the system to manage coherency among multiple clusters. Each cluster may be packaged as a single chip die, a module comprising multiple chip dies, or other packaging apparatus known in the art. Each cluster may be an identical configuration, or may be different configurations. For a first example, each cluster may comprise six processor cores 501 to 506. In a second example, one cluster may comprise six processor cores and another cluster may comprise four processor cores 501 to 504.

In an embodiment (FIG. 7), a system may consist of a single cluster 700. The cluster may be communicatively coupled 113 to memory subsystem 108 and an I/O subsystem 107 for attachment to peripheral or network devices. The single cluster cache coherency is managed by the single cluster.

In computing, cache coherence is the consistency of shared resource data that ends up stored in multiple local caches.

When clients in a system maintain caches of a common memory resource, problems may arise with inconsistent data. This is particularly true of central processing units (CPUs) in a multiprocessing system. Referring to the illustration on the right, if the top client has a copy of a memory block from a previous read and the bottom client changes that memory block, the top client could be left with an invalid cache of memory without any notification of the change. Cache coherence is intended to manage such conflicts and maintain consistency between cache and memory.

In a shared memory multiprocessor system with a separate cache memory for each processor, it is possible to have many copies of any one instruction operand: one copy in the main memory and one in each cache memory. When one copy of an operand is changed, the other copies of the operand must be changed also. Cache coherence is the discipline that ensures that changes in the values of shared operands are propagated throughout the system in a timely fashion.

There are three distinct levels of cache coherence:
1. every write operation appears to occur instantaneously;
2. all processors see exactly the same sequence of changes of values for each separate operand; and
3. different processors may see an operation and assume different sequences of values; this is considered to be a non-coherent behavior.

In both level 2 behavior and level 3 behavior, a program can observe stale data. Recently, computer designers have come to realize that the programming discipline required to deal with level 2 behavior is sufficient to deal also with level 3 behavior. Therefore, at some point only level 1 and level 3 behavior will be seen in machines.

Coherence defines the behavior of reads and writes to the same memory location. The coherence of caches is obtained if the following conditions are met:
1. In a read made by a processor P to a location X that follows a write by the same processor P to X, with no writes of X by another processor occurring between the write and the read instructions made by P, X must always return the value written by P. This condition is related with the program order preservation, and this must be achieved even in monoprocessed architectures.
2. A read made by a processor P1 to location X that happens after a write by another processor P2 to X must return the written value made by P2 if no other writes to X made by any processor occur between the two accesses and the read and write are sufficiently separated. This condition defines the concept of coherent view of memory. If processors can read the same old value after the write made by P2, we can say that the memory is incoherent.

3. Writes to the same location must be sequenced. In other words, if location X received two different values A and B, in this order, from any two processors, the processors can never read location X as B and then read it as A. The location X must be seen with values A and B in that order.

These conditions are defined supposing that the read and write operations are made instantaneously. However, this doesn't happen in computer hardware given memory latency and other aspects of the architecture. A write by processor P1 may not be seen by a read from processor P2 if the read is made within a very small time after the write has been made. The memory consistency model defines when a written value must be seen by a following read instruction made by the other processors.

Rarely, and especially in algorithms, coherence can instead refer to the locality of reference.

Directory-Based

In a directory-based system, the data being shared is placed in a common directory that maintains the coherence between caches. The directory acts as a filter through which the processor must ask permission to load an entry from the primary memory to its cache. When an entry is changed the directory either updates or invalidates the other caches with that entry.

Snooping

This is a process where the individual caches monitor address lines for accesses to memory locations that they have cached. It is called a write invalidate protocol when a write operation is observed to a location that a cache has a copy of and the cache controller invalidates its own copy of the snooped memory location.

Snarfing

Snarfing is a mechanism where a cache controller watches both address and data in an attempt to update its own copy of a memory location when a second master modifies a location in main memory. When a write operation is observed to a location that a cache has a copy of, the cache controller updates its own copy of the snarfed memory location with the new data.

Distributed shared memory systems mimic these mechanisms in an attempt to maintain consistency between blocks of memory in loosely coupled systems.

The two most common mechanisms of ensuring coherency are snooping and directory-based, each having its own benefits and drawbacks. Snooping protocols tend to be faster, if enough bandwidth is available, since all transactions are a request/response seen by all processors. The drawback is that snooping isn't scalable. Every request must be broadcast to all nodes in a system, meaning that as the system gets larger, the size of the (logical or physical) bus and the bandwidth it provides must grow. Directories, on the other hand, tend to have longer latencies (with a three hop request/forward/respond) but use much less bandwidth since messages are point to point and not broadcast. For this reason, many of the larger systems (>64 processors) use this type of cache coherence.

For the snooping mechanism, a snoop filter reduces the snooping traffic by maintaining a plurality of entries, each representing a cache line that may be owned by one or more nodes. When replacement of one of the entries is required, the snoop filter selects for replacement the entry representing the cache line or lines owned by the fewest nodes, as determined from a presence vector in each of the entries. A temporal or other type of algorithm is used to refine the selection if more than one cache line is owned by the fewest number of nodes.

The MESI protocol (known also as Illinois protocol due to its development at the University of Illinois at Urbana-Champaign) is a widely used cache coherence and memory coherence protocol. It is the most common protocol which supports write-back cache.

Every cache line is marked with one of the four following states (coded in two additional bits):

Modified: The cache line is present only in the current cache, and is dirty; it has been modified from the value in main memory. The cache is required to write the data back to main memory at some time in the future, before permitting any other read of the (no longer valid) main memory state. The write-back changes the line to the Exclusive state.

Exclusive: The cache line is present only in the current cache, but is clean; it matches main memory. It may be changed to the Shared state at any time, in response to a read request. Alternatively, it may be changed to the Modified state when writing to it.

Shared: Indicates that this cache line may be stored in other caches of the machine and is "clean"; it matches the main memory. The line may be discarded (changed to the Invalid state) at any time.

Invalid: Indicates that this cache line is invalid (unused).

In a typical system, several caches share a common bus to main memory. Each also has an attached central processing unit (CPU) which issues read and write requests. The caches' collective goal is to minimize the use of the shared main memory.

A cache may satisfy a read from any state except Invalid. An Invalid line must be fetched (to the Shared or Exclusive states) to satisfy a read.

A write may only be performed if the cache line is in the Modified or Exclusive state. If it is in the Shared state, all other cached copies must be invalidated first. This is typically done by a broadcast operation known as Request For Ownership (RFO).

A cache may discard a non-Modified line at any time, changing to the Invalid state. A Modified line must be written back first.

A cache that holds a line in the Modified state must snoop (intercept) all attempted reads (from all of the other caches in the system) of the corresponding main memory location and insert the data that it holds. This is typically done by forcing the read to back off (i.e. retry later), then writing the data to main memory and changing the cache line to the Shared state.

A cache that holds a line in the Shared state must listen for invalidate or request-for-ownership broadcasts from other caches, and discard the line (by moving it into Invalid state) on a match.

A cache that holds a line in the Exclusive state must also snoop all read transactions from all other caches, and move the line to Shared state on a match.

The Modified and Exclusive states are always precise: i.e. they match the true cache line ownership situation in the system. The Shared state may be imprecise: if another cache discards a Shared line, this cache may become the sole owner of that cache line, but it will not be promoted to Exclusive state. Other caches do not broadcast notices when they discard cache lines, and this cache could not use such notifications without maintaining a count of the number of shared copies.

In that sense the Exclusive state is an opportunistic optimization: If the CPU wants to modify a cache line that is in state S, a bus transaction is necessary to invalidate all other cached copies. State E enables modifying a cache line with no bus transaction.

A variation of the MESI protocol is the MOESI protocol that includes an "owned" state: This cache is one of several with a valid copy of the cache line, but has the exclusive right to make changes to it. It must broadcast those changes to all other caches sharing the line. The introduction of owned state allows dirty sharing of data, i.e., a modified cache block can be moved around various caches without updating main memory. The cache line may be changed to the Modified state after invalidating all shared copies, or changed to the Shared state by writing the modifications back to main memory. Owned cache lines must respond to a snoop request with data.

Processor CLUSTERS

Figure 8:
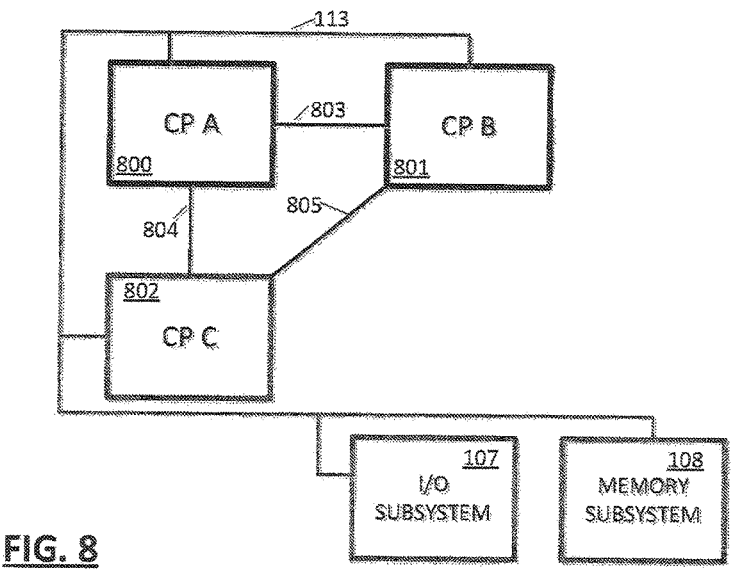
FIG. 8 depicts an example multi-CP configuration.

In an embodiment (FIG. 8), a system may consist of multiple clusters 800 to 802, the multiple clusters 800 to 802 may be communicatively coupled 113 to a shared memory 108 and I/O 107. The multiple clusters may include a shared L3 cache in one embodiment. Cache coherency may be managed cooperatively by the multiple clusters of the system.

In an embodiment (FIG. 1), the system may comprise a plurality of clusters 109 to 111 and a storage control (SC) function 112. The clusters interconnected 100, 101, 105 with each other and communicatively coupled 102, 103, and 104 with the SC 112. The SC 112 may include a higher level cache (L4). Clusters 109 to 111 may be communicatively coupled 113 with a shared memory subsystem 108 and an I/O subsystem 107. In an embodiment, an interconnected plurality of clusters 109 to 111 and SC 112 may constitute a "node". In one embodiment the SC 112 includes an inclusive cache directory such that the SC 112 has knowledge of all lines of the node. In an embodiment, the inclusive cache directory function is distributed amongst the processors and may be implemented by the combined non-inclusive cache directories of all clusters of the node. The SC 112 may determine whether a cache access of the node can be handled entirely within the node (such as a processor of the node requesting ownership of a cache line already owned by a processor of the node), or that a cache access of the node must interrogate other nodes (such as a processor of the node requesting ownership of a cache line, not currently owned by the node). In an embodiment, the SC 112 function may be provided by cooperative logic of the processors 109 to 111 of the node. In this embodiment, the processors cooperate to determine if an access to an external node is required, and the requesting processor may then control coherency accesses to other nodes on behalf of the node. In another embodiment the SC 112 function may be provided by dedicated logic, perhaps in a separate chip die of the node for example.

A configuration (FIG. 1) may include computer storage media 114.

Figure 2:
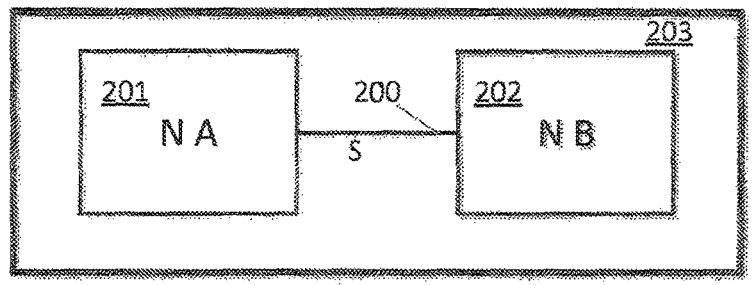
FIG. 2 illustrates one example of components of a drawer.

In an embodiment (FIG. 2), a plurality of nodes 201, 202 may be packaged as a "drawer" 203 and interconnected by an S-Bus 200.

Figure 3:
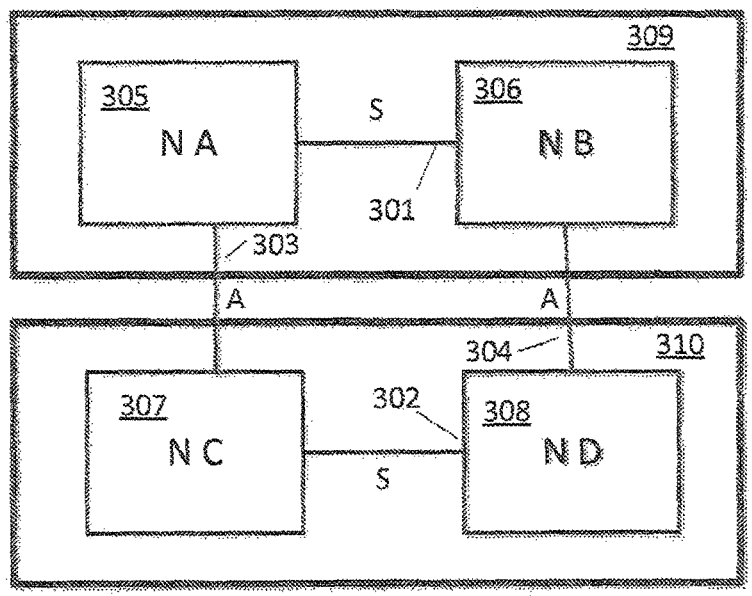
FIG. 3 illustrates one example of components of two drawers.

In an embodiment (FIG. 3), a system may comprise a plurality of drawers 309, 310, each node of a drawer 309, 310 may be communicatively coupled by a respective S-Bus 301, 302 within respective drawer. Preferably, each node of drawer 305, 306 is communicatively coupled with a node 307, 308 of another drawer 310 by way of an A-Bus 303, 304. Intra node coherency communication may be performed in an embodiment using pass-thru and a combination of S-Bus and A-Bus links. Preferably (FIG. 4), separate A-Buses 400 to 405 and 409 to 414 are provided between nodes 424 to 431 of each drawer of a configuration, and on drawer nodes 424, 426, 428, 430 are communicatively coupled to other node(s) 425, 427, 429, 431 of the respective drawer via a corresponding on-drawer S-Bus 406, 407, 408, 419. In an embodiment, nodes of a drawer may act as pass-thru paths for drawer to drawer communication. In such an embodiment, only one set of drawer to drawer A-Busses are needed 400, 401, 402 and function provided by a second set of A-Busses 403, 404, 405 is provided by a node 424, 426, 428, 430 passing communications from the single set of A-Busses 400, 401, 402 of each drawer through respective S-Busses 406, 407, 408, 419 to other node(s) 425, 427, 429, 431.

Preferably, buses used to communicatively couple elements (clusters, nodes, drawers) are provided for direct communication. Thus, each element has a direct link to each other element. In another embodiment, one or more elements are communicatively coupled by providing a pass-thru function at an element to reduce the number of busses required. Buses may be unidirectional pairs (FIG. 9, CP1 900 REC-X DRV-X pair for example), common bidirectional protocol or multi-drop busses for example.

Figure 9:
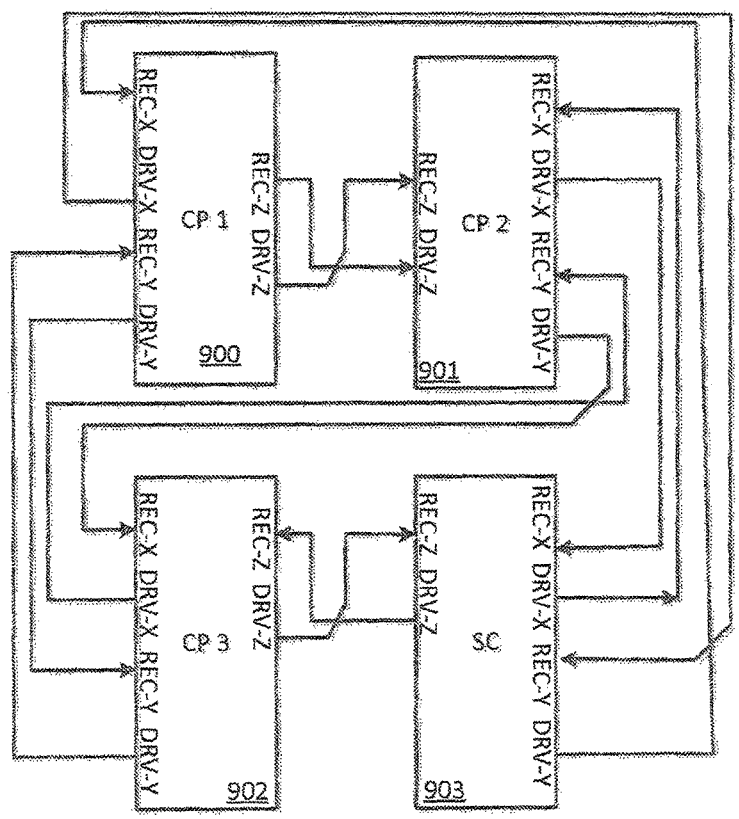
FIG. 9 depicts an example CP interconnection.

FIG. 9 depicts an example interconnection of clusters 900, 901, 902 and an SC 903. Each element (chip die) having three pairs (X, Y and Z) of unidirectional buses (REC-X DRV-X, REC-Y DRV-Y and REC-Z DRV-Z). In this cluster confirmation, each element has a direct connection with each of the other elements of the cluster.

In an embodiment, cache coherency amongst processors is performed across the cache hierarchy at the lowest level, to improve performance and minimize interference. Thus for example, when possible, only cache coherency operations of caches of a cluster that need access to caches of other clusters, may access other clusters, only cache coherency operations of caches of a node that need access to caches of other nodes may access other nodes and only cache coherency operations of a caches of a drawer that need access to caches of other nodes may access other nodes for example.

In an embodiment, cache lines that are owned or shared by processors of an entity at a level of coherency (cluster, node, and drawer) are candidates to be handled at the level of coherency. Thus, if a processor of the entity requests ownership or sharing of a line that is already owned by a processor of the entity, the entity need not access other entities to handle the request coherently. Furthermore, if a processor of an entity requests sharing of a line owned or shared by a processor of the entity need not access other entities to handle the request. A request, for example, by a processor of node A FIG. 4 424, for sharing of a cache line is examined by SC function to determine if the line is owned or shared by a processor of Node A. If it is already owned or shared, the SC handles the request within the node without accessing any other node. If the line is neither owned nor shared by a processor of Node A, the SC of Node A performs a cache coherency operation with other nodes 425 to 431. In an embodiment, in such a scenario, certain Node coherency operations may speculatively broadcast the request to other nodes before determining that the line is shared or owned by a processor of Node A. In that case, the other nodes may examine their coherency state for the cache line for example before being required to actually participate in the coherency operation. The speculative request may later be cancelled or time out if the requesting node discovers it is not needed.

In embodiment, topology of a configuration is discovered by each cluster of a configuration, for example at configuration initialization time. When a cluster is powered on, signals may be transmitted over cluster interfaces in order to determine whether other clusters or support elements (SCs for example) are communicatively coupled to the signaling cluster. This may be performed by micro-code (firmware) of the cluster. Based on the signaling, the cluster may record a configuration value that represents the cluster's view of the topology. In one example, the cluster may record a bit-significant value wherein each bit represents the state of a corresponding interface. In another embodiment, the configuration value represents the protocol to be used by the cluster. Thus, a single cluster configuration (FIG. 7, 700) would record a configuration value indicating no such interconnections are active. A cluster (800 FIG. 8) of a multi-cluster configuration (800, 801, 802) would record a configuration value indicating interconnections 803, 804 to other clusters 801, 802 are active. A cluster (FIG. 1, 109) of a multi-cluster configuration having an SC function 112 would record a configuration value indicating interconnections 100, 101, 102 to other clusters 110, 111 and an SC 112 are active. In an embodiment, an SC function (FIG. 6, 600) of a node (FIG. 1, 109 to 111) may record a configuration value indicating whether interconnections to other nodes (on-drawer SC chip 406) or to nodes of other drawers (off-drawer SC chips 400, 401, 402) are active and set a configuration value indicating the drawer interconnectivity. In one multi-drawer configuration example (FIG. 4) having 2 nodes 424, 425 per drawer 420, a node 424 of a drawer 420 may determine that an S-Bus 400, 401, 402 is active to another node 425 of the drawer, and that three node A-Bus interfaces 400, 401, 402 are active to corresponding nodes 426, 428, 430 of three corresponding other drawers 421, 422, 423. A node 424 may also similarly determine that other nodes 427, 429, 431 of other drawers are communicatively coupled by a pass-thru function for example utilizing S-Bus 406, 407, 408, 419. In such a configuration a signal from a node 424 via an S-Bus 406 to another node 425 of the drawer 420 that returns a configuration value of the other node 425 indicating other nodes 427, 429, 431 of respective other drawers 421, 422, 423 are communicatively coupled to the other node 425, and accessible by a pass-thru function of the other node 425.

In an embodiment, the resulting configuration value of a node determines whether coherency of the node is to be determined by a first coherency protocol of a configuration having no SC function (FIG. 8) or a second coherency protocol of a configuration having an SC function (FIG. 1), the first coherency protocol being controlled solely by clusters of the node, the second coherency protocol being controlled entirely within the node by an SC 112 of the node.

In an embodiment, the resulting configuration value of the node (FIG. 3, 305) may determine whether coherency of a node 305 is to be determined by a third coherency protocol of a configuration having another node(s) 306 in the same drawer, or a fourth coherency protocol of a configuration having other drawer(s) 310 having other node(s) 307, 308.

A modern processor chip (silicon die) can therefore find itself being used in a variety of system configurations and it would be advantageous for the chip to be able to optimize the cache coherency protocol that is used based on the configuration it is in. As used herein, a processor chip is described, but embodiments would be equally valuable in other packages, for example, a multi-chip module providing a processor function.

In embodiments, a chip is capable of detecting the system configuration it is in and customize the cache coherency protocol that is used in the configuration as a result. This allows us to build a variety of system structures to better meet the requirements of an individual system, based on the same chip.

Figure 4:
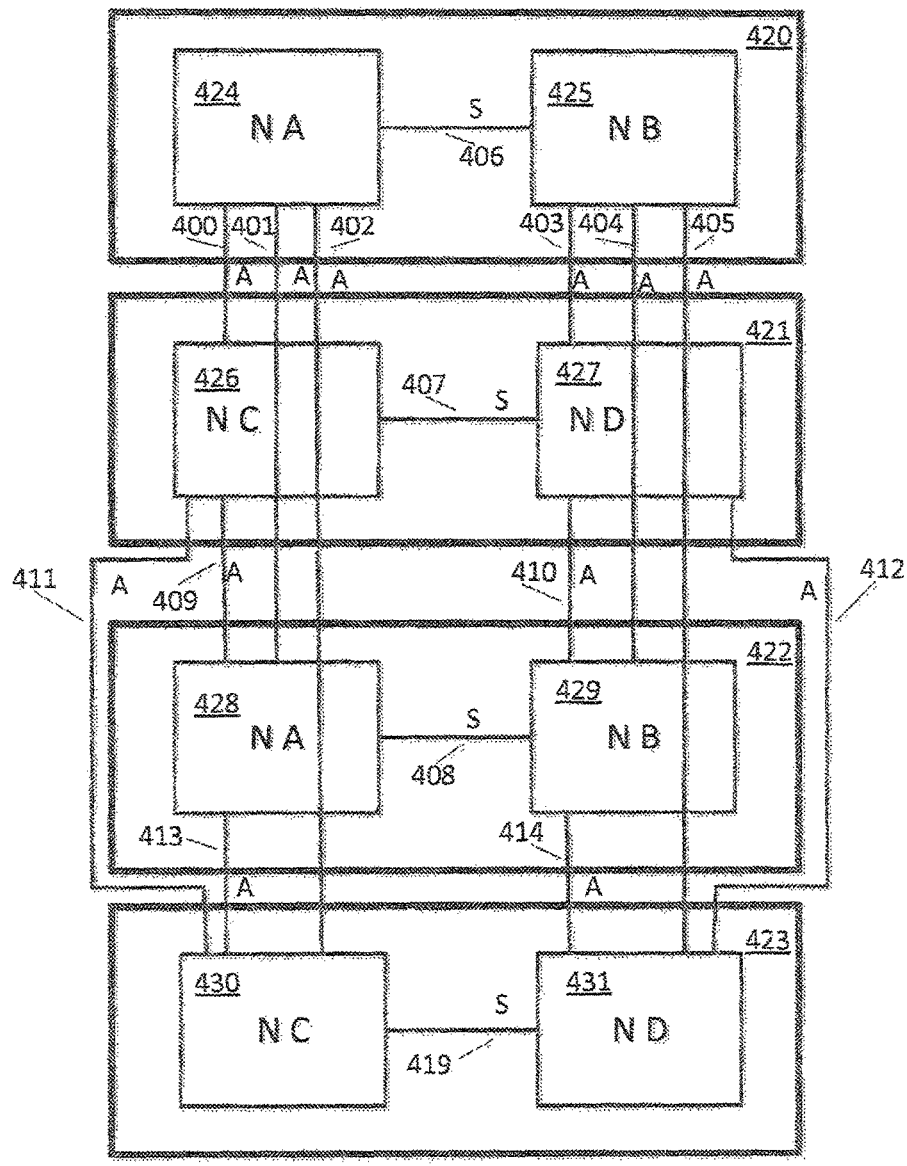
FIG. 4 illustrates one example of components of four drawers.

Referring to FIG. 4, in an embodiment, a fully configured SMP system may consist of four "drawers" 420 to 423, each may comprise up to two nodes 424 and 425, 426 and 427, 428 and 429, 430 and 431. Each node in the high-end configuration may consist of three CP chips 109 to 111 and one SC chip 112 as shown in FIG. 1.

Figure 5:
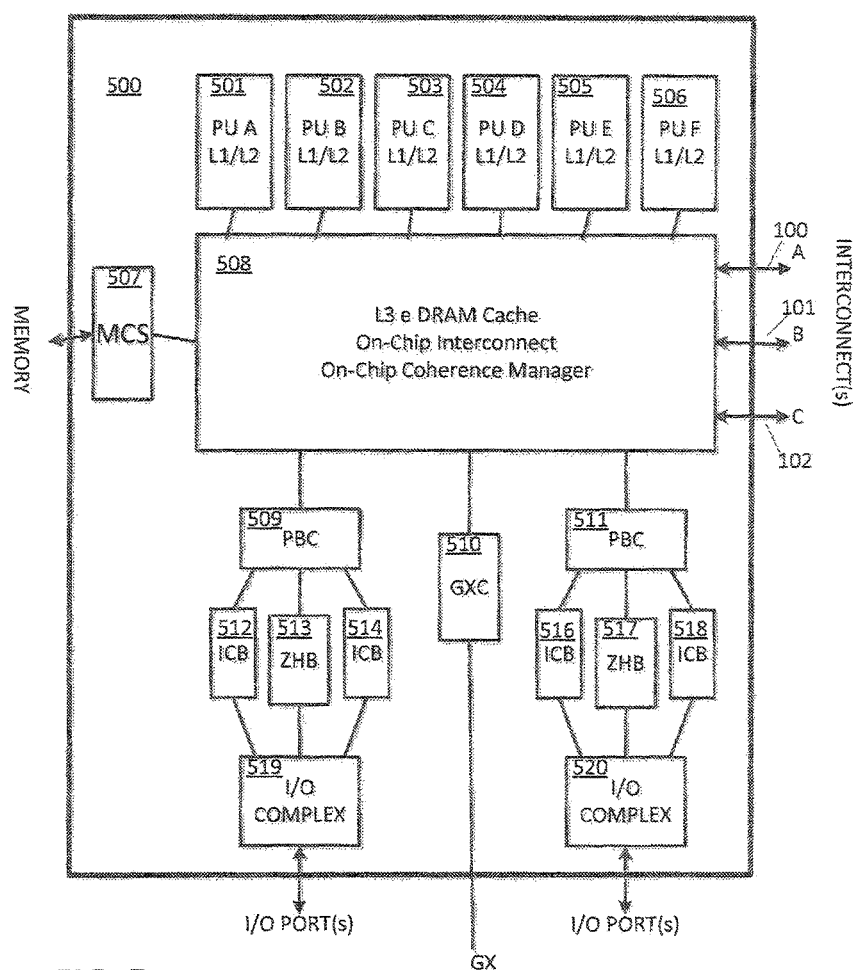
FIG. 5 depicts components of an example central processor (CP)
Figure 6:
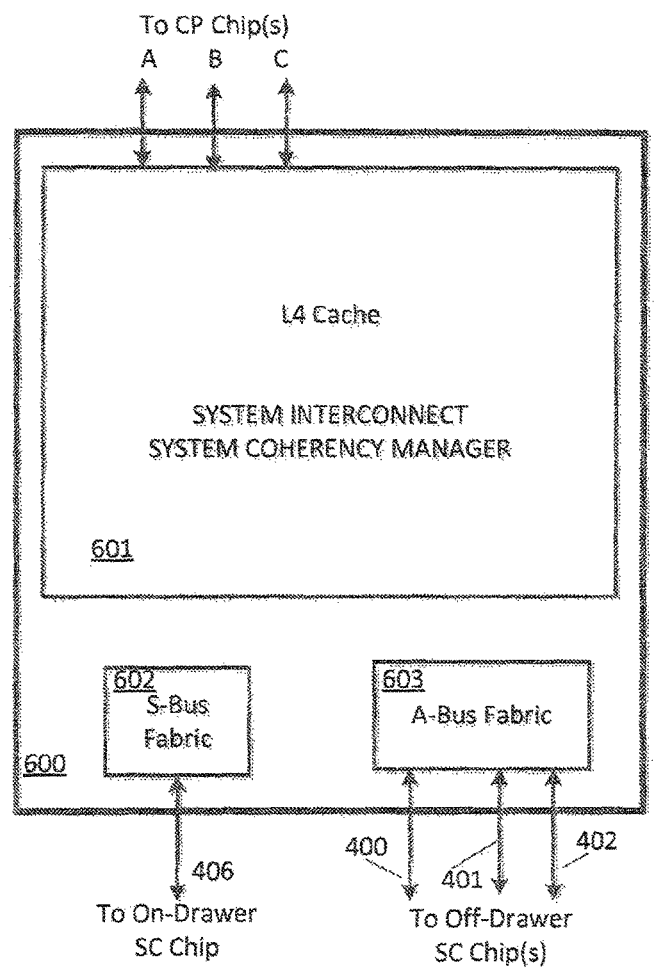
FIG. 6 depicts components of an example SC.

An example diagram of the L3 (FIG. 5) and L4 (FIG. 6) cache hierarchy, cache controllers and their key components and interactions may be provided, which may interact as shown in FIGS. 5 and 6. As shown for example, the CP chip 500 may contains six processor cores 501 to 506, a shared L3 cache 508, ports to access Main Memory by way of a memory control system (MCS) 507 and IO ports by way of respective I/O complexes 519, 520. In an embodiment, the L3 cache 508 is interconnected to a respective I/O complex 519, by way of a PBC 509 and any one of an ICB 512, ZHB 513 or ICB 514, or to a respective I/O complex 520, by way of a PBC 511 and any one of an ICB 516, ZHB 517 or ICB 518 or to a GX bus by way of a GXC 510. In an embodiment, each CP chip 500 may include an X-Bus interconnection A, B, C for direct access to up to two other CP chips 500 and an SC chip (FIG. 6) 600. By way of an X-Bus 100 to 105 The SC chip 600 may contains a fully shared L4 cache 601 and interconnections A B and C for interconnection with three CP chips. The SC chip 600 may also include S-Bus Fabric 602 with connection 406 to an On-Drawer SC Chip and A-Bus Fabric 603 with connections 400, 401, 402 to Off-Drawer SC Chip(s). The CP 500 chips and SC 600 chip on the same node communicate via the X-Bus interface (FIG. 1) 100 to 105. A node may consist of up to four chips connected in a point-to-point fully connected X-Bus topology. The number and type of chips connected to the X-Bus varies depending upon the system configuration. When the SC chip 600 is in the configuration, it may serve as the coherency point. However, because the CP chip contains all necessary connections and coherency maintenance functionality, the SC chip is not required to be installed in Low End configurations.

Figure 7:
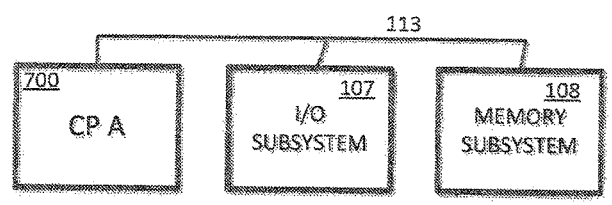
FIG. 7 depicts an example single CP configuration.

If a SC chip is not present in the system, the CP chip must support the coherency protocol. In an embodiment, the same CP chip design could find itself in any of several possible system configurations:

1. The CP chip (FIG. 5) 500 could be the only chip in the system, as shown in FIG. 7, 700. In this configuration, cache lines that miss in the L3 cache may be fetched directly from Main Memory via the memory interface on the single CP chip 700 and lines that age out of the L3 cache 508 may be stored directly to the Main Memory in a similar manner. The on-chip L3 cache 508 may act as the coherency point and may manage ownership of the cache line.
2. The CP chip (FIG. 5) 500 could be in a system (FIG. 8) with one or more peer CP chips 800, 801, 802. In this configuration, on-chip L3 misses are broadcasts off chip to the other (1 or 2) CP chips over the X-Bus interface 803, 804, 805. The X-Bus interface may provide direct point-to-point communication between each CP chip in the configuration. The L3 cache(s) on the other CP chip(s) may be queried, and the resulting hit status may be communicated on the X-Bus 803, 804, 805 and transmitted to the other CP chips 800, 801, 802 in the system, including the requesting CP chip. Because each chip may receive directory look-up information providing status of the target line from all other chips, each chip is able to combine the resulting information from each chip (using partial response information (Presp)) into an overall system-wide snapshot of the status of the target line (combined response information (Cresp)). The Presp or partial response refers to the portion of the cache line coherency state that can be determined by querying only the directory state of one CP chip in the node. The Cresp or combined response refers to the full shared cache coherency state that can be determined by each chips XBUS reception hardware through the combination of all Presps received from all other chips on the node. If the target line hit in the L3 cache on one of the remote (non-requesting) CP chips, the fetch data is sourced from that chip. If the line missed in the L3 cache on all CP chips, the line is sourced from Main Memory. Note that the memory target CP can be any of the CP chips in the system, including the requesting chip. L3 Cache control logic on each CP chip may determine independently whether or not it should source the data depending on the local hit state, memory state and the resulting cache hit states from the other CP chips as communicated via the X-Bus 803, 804, 805.

3. The CP chip (FIG. 5) 500 could be in a large system with 1 or more peer CP chips 109, 110, 111 and an SC chip 112 as shown in FIG. 1. In this configuration, fetches that miss in the local L3 may be broadcast to the other CP chip(s) 109, 110, 111 and the SC chip 112. The SC chip contains a large L4 cache shared by all CP chips in the system. The L4 cache 601 (FIG. 6) may not be fully inclusive of all L3 caches on a node, however, the L4 cache controller (system coherency manager 601) may keep track of all lines on the node via the utilization of a L4 Non Inclusive Cache Directory which maintains the state of lines in the L3 that are not also in the L4. In this configuration, on-chip L3 misses may be broadcast off chip to the other (1 or 2) CP chips 109, 110, 111 and the SC chip 112 over the X-Bus interface 100 to 105. The X-Bus interface provides direct point-to-point communication between the SC chip and each CP chip in the node. When a SC is present it acts as the coherency point for the system, thereby enabling effective coherency management across additional nodes and/or drawers. In such a system the L3 still may manage coherency across the local node, but it may rely on the SC to provide information about the state of the target line in the local L4 and (in multi-node/drawer configurations) the state of the target line in other L3 and L4 caches on other nodes and/or drawers. As a result, the L3 behavior and management sequences are different in multi-chip configurations that contain a SC chip than in multi-chip configurations that do not contain an SC chip.

In an embodiment, the chips detect the configuration of the system at startup. When the chips are initially powered on, each chip has no available off-chip interfaces to any other chip. As the hardware is being initialized by microcode for example (firmware used internally to perform tasks on behalf of hardware), the off-chip interfaces on the CP chips may be calibrated by firmware to allow for chip to chip communication. When an interface is successfully calibrated, firmware sets a status bit to indicate that the interface is now valid and available for chip to chip communication and provides additional information as to what type of chip is connected to each valid interface. By analyzing the collective state of these valid indications, the L3 cache controller may determine which interfaces have active connections and the topology of the system, i.e. whether the CP chip is interfaced to other CP chips and, in an embodiment, an SC chip.

Based on this information the L3 cache controller may provide the coherency protocol and mechanism that is used for chip to chip communication. In the simplest case, the chip may be the only one in the system (no other chips return a response) and so it only needs to manage coherency between the cores on the chip. In the peer CP only case (more than one CP chip but no SC chip), based on the interface valid setting, the protocol may be provided so that one of the CP chips serves as the point of coherency in the system. The point of coherency may done on an individual line basis based on the state of the cache line in each chip, (a CP chip point of coherency for a particular cache line may be managed by one CP chip, and another cache line by another CP chip. In the systems with both CP and SC chips, the protocol may be provided for a multi-tiered protocol with the SC serving as a global point of coherency for the system and the CP chips serving as a local point of coherency for the node.

For example, when a CP determines via the analysis of the interface valid indications that it is connected only to other CP chips, it knows that the system topology is that of a relatively small SMP structure. It may determine then that off-chip communication should be optimized for system performance and choose to use a snooping process for the coherency mechanism and a protocol such as MESI for managing the coherency between CP chips. Alternatively, if the analysis of the interface valid indications indicates that the CP is connected to an SC chip, it knows that it is a part of a large SMP structure. In such a case a more scalable coherency mechanism, like a directory based mechanism, is more appropriate, and using a different protocol such as MOESI may be a better choice for managing the coherency between caches.

In an embodiment, each cluster determines at initialization time, whether the node of the cluster includes other clusters or an SC and records a corresponding coherency value and uses the recorded corresponding coherency value during normal operation to determine which interfaces are to be utilized. Furthermore, in an embodiment, the cluster utilizes an MESI protocol if no SC is present, but utilizes an MOESI protocol if an SC is present.

In an embodiment, the SC function, if present in the node, determines at initialization time whether the node of the SC includes other clusters and whether the node is communicatively coupled to other nodes (and therefore the configuration topology). The SC function of the node may use it's recorded corresponding coherency value during normal operation to determine which interfaces are to be utilized, and what local cache coherency (fabric) protocol should be used and which global cache coherency (fabric) protocol should be used.

In an embodiment, analysis of the interface valid, by an SC chip determines whether other nodes exist. If the node of the SC chip is the only node in the system, overhead of inter-node coherency operations may be eliminated.

Thus, coherency for a line that only effects the on-chip processing units (PUs) 501 to 506 (FIG. 5) of CPs 109, 110, 111 (FIG. 1) of a node, may be managed without interfering with other nodes, greatly improving system performance. For one example, if a PU of a node "owns" a cache line and another PU of the same node requests ownership, the request and exchange of ownership can be accomplished without perturbing other nodes.

In an embodiment, the physical X-Bus may be used for transmitting memory commands and memory data and may be divided into two logical buses. The first bus is a shared address and data bus (i.e. the primary bus). The second bus is the response sideband bus. Full chip to chip X-Bus connectivity is shown in FIG. 9. Each chip of the node has a Drive, Receive pair of busses dedicated to another chip of the node. The X-Bus protocol sequence can be broken down into several discrete steps. All sequences on an example X-Bus may begin with these initial four steps:

1. The requesting chip initiates the sequence by broadcasting the command and address to all remote chips on the node. Any chip on the node may be the requesting chip for a particular operation.
2. The command/address broadcast is received by each of the remote chips and a snoop pipe pass is made. The snoop pipe pass may generate a partial response (PRESP) and load snoop information in a controller on the remote chip.
3. Each remote chip may broadcast its PRESP to every other chip on the node (i.e. both the requesting chip and the other remote chips).
4. All chips on the node may collect all the PRESPs and then generate a combined response (CRESP) for the controller that is processing the sequence. Based on the CRESP, one of the chips on the node is established as the point of coherency for the line and is responsible for protecting the line for the duration of the sequence.

At this point the sequence of responses varies depending on the type of operation and the CRESP. The example case of a fetch sent by the requesting chip with data sourced by a remote chip is described here:

5. The remote chip that sources the data may send a data response (DRESP) to the requesting chip. The remote chip may speculatively send the DRESP before the CRESP.
6. All remote chips may make any necessary directory updates.
7. All remote CP chips may send a final response (FRESP) to the requesting chip.
8. If the requesting chip is a CP, it may send a reset response (RRESP) to the SC to reset the SC controller.

Upon receiving a command/address request, each remote chip may make a snoop pipe pass to check the state of the requested line in its cache. The snoop pipe pass may also check for resource availability and address contention with other requests. The results of this pipe pass, called the partial response, may then broadcast to all other chips on the node.

The XBUS protocol may be different in the High End (HE) configuration which may contain an SC chip (FIG. 1) and the Low End (LE) configuration (FIG. 8) which may contain only CP chips.

In the Low End (LE) Configuration, the Local Intervention Master (LIM) L3 is preferably the primary serialization and coherency point on the node. The LIM L3 may be the L3 on the CP chip that will source data. In this configuration, the L3 on remote CP chips may send reject Partial Responses over the XBUS based on address compares detected during the snoop pipe pass on the remote CP chip. Upon receipt of these reject Partial Responses the requesting CP chip may at a later time retry the command broadcast onto the XBUS.

In the High end (HE) configuration (FIG. 1), the SC Chip 112 may be the serialization and coherency point on the node. The L3 of the CPs preferably will not reject any X-Bus requests in the HE configuration, its PRESP preferably will only contain the L3 directory results. The L3 preferably must wait for a non-reject CRESP before it can invalidate the L3 directory. If there is an address or resource conflict on the snoop, the L4 may send the SC reject PRESP. The L4 controller will preferably wait for the conflict to resolve and then send an FRESP to cause the requesting L3 to rebroadcast its request. The first request to the SC may load an address into a controller in the SC which may reject subsequent requests to the same address. The address may be protected by the L4 controller, which may remain valid for the duration of the operation. The L4 may reject requests from other L3s as well as protect the line from global fabric requests. At the end of the sequence, the L3 controller may notify the L4 controller that it is safe to reset.

In both HE and LE configurations, requests for data may be sourced by the Local Intervention Master (LIM) chip on the node. There may always be a LIM chip on the node. The L4 may not be fully inclusive, however it may keep track of all lines on the node. The L4 Non Inclusive Cache (NIC) Directory may be used to keep track of lines in the L3 that are not also in the L4. Therefore, in HE configurations, the LIM chip could be the SC or one of the CP chips, but the L4 is always the coherency point.

In the LE configuration, local and/or remote L3 controllers may set LIM (local intervention master) pending and LMM (local memory master) pending to protect the address and enable address compares in order to protect line coherency. The determination as to which CP chip will set the LIM pending may be determined by the local hit state and the combined hit states of the other two CP chips as determined by the Cresp (combination of the Presp states from other CP chips) and may be determined in parallel on all CP chips as a result of the fully connected X-Bus protocol. The determination as to which CP chip will set the LMM pending may be determined by which chip contains the target line's main memory location.

The L3 controllers will not set LIM or LMM pending in the HE configuration, coherency may be maintained by address compares in the L4 cache controller.

Another difference between the LE and HE protocol preferably involves the conditions for blocking the ingate of the local L3 miss controller. Ingate of this controller may only be allowed if all necessary remote resources are available. Only remote resources that are actually present in the configuration may be factored into the local L3 miss controller blocking logic. Therefore, if there is no SC chip in the configuration, the requesting CP chip (L3) does not need to check or wait for resource availability on the SC chip. Based on this indication in the configuration setting, the CP L3 X-Bus command launch hardware arbitration will skip the logic that performs the SC resource checking and possible transitions to wait states for SC resources. In a similar manner, the CP L3 X-Bus command launch hardware will check the indication for whether or not there are one or two other CP chips in the system, and if not, skip the logic that performs the remote CP resource checking and possible transitions to wait states for remote CP resources. Additionally, the broadcast rate onto the X-Bus may have a required restriction in High End configurations due to pipelining availability in the L4. This broadcast rate restriction can also be dynamically removed once it is determined that the current configuration does not include an L4/SC chip.

Figure 11:
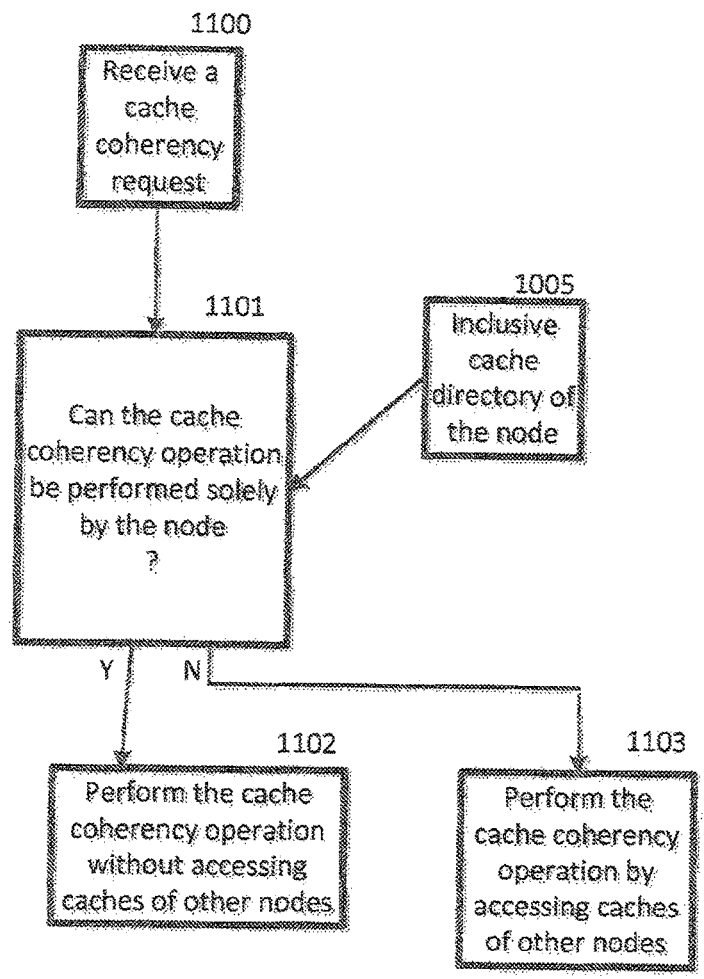

Referring to FIG. 11, in an embodiment a cache coherency request may be received 1100 and, using an inclusive cache directory of a node 1005, a determination 1101 may be made of whether the cache coherency operation can be performed solely by the node. If the answer is yes (Y), the cache coherency operation may be performed 1102 without accessing caches of other nodes. If the answer is no (N), the cache coherency operation may be performed 1103 by accessing caches of other nodes.

Figure 12:
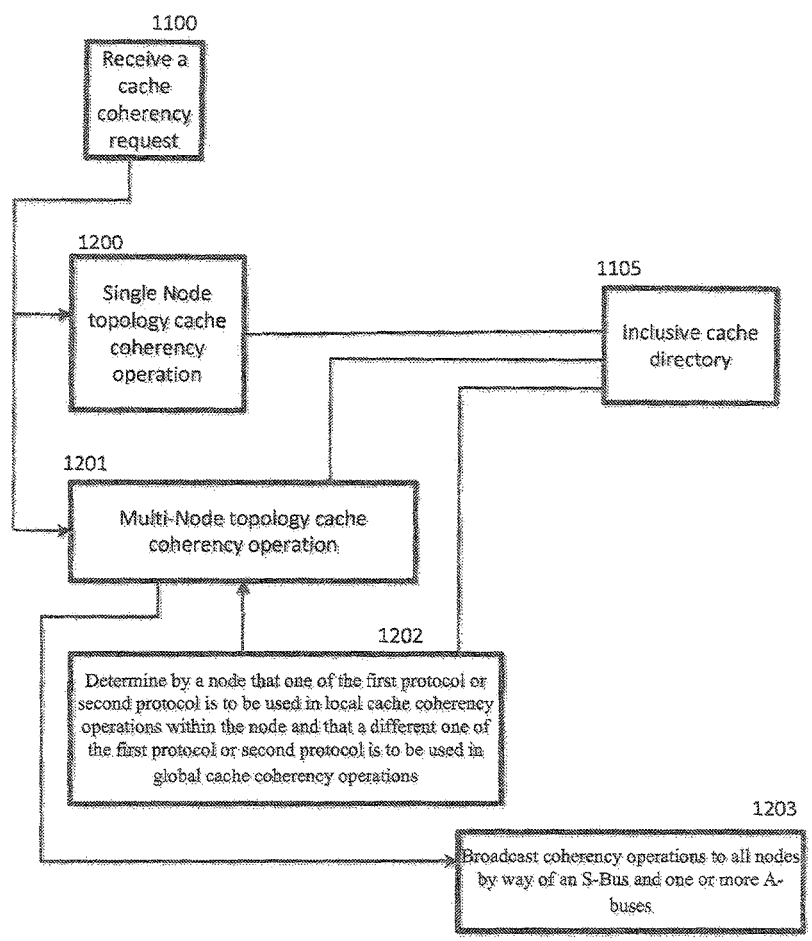

Referring to FIG. 12, in an embodiment, a cache coherency request may be received 1100 and, based on an inclusive cache directory 1105, either a single node topology cache coherency operation is performed 1200 or a multi-node topology cache coherency operation may be performed 1201, In the case of the multi-node topology cache coherency operation being performed 1201, a determination may be made 1202 by a node that one of the first protocol or second protocol is to be used in local cache coherency operations within the node and that a different one of the first protocol or the second protocol is to be used in global cache coherency operations. In the case of the multi-node topology cache coherency operation being performed 1201, coherency operations may be broadcast to all nodes by way of an S-Bus and one or more A-Busses.

Figure 10:
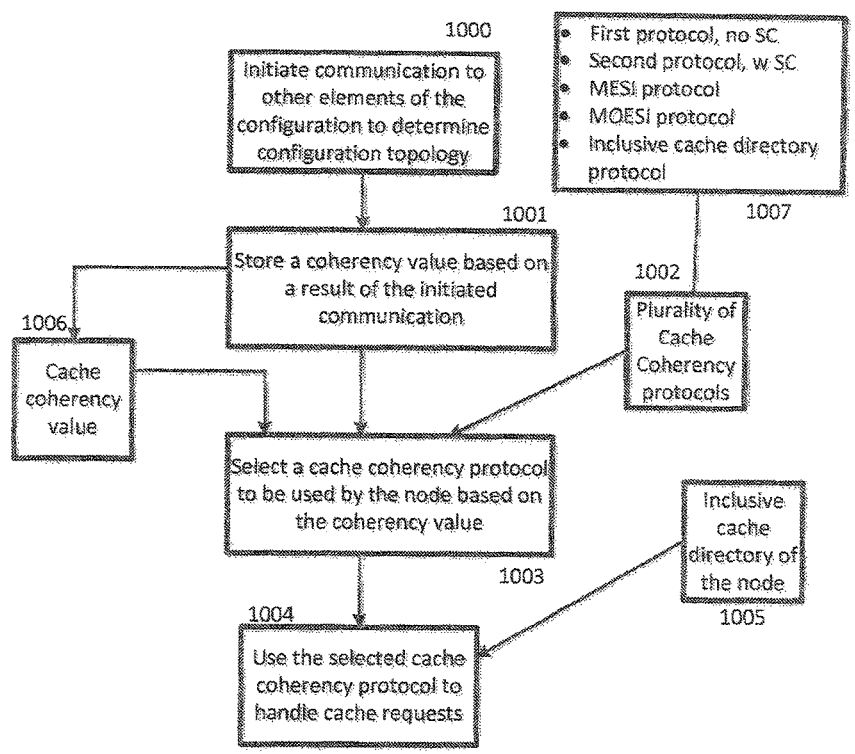
FIGS. 10-12 depict example operations of embodiments.

In an embodiment, one of a plurality of cache coherency protocols is performed in a computer system comprising one or more communicatively coupled computer elements 109 to 112 of a first node, each computer element 109 to 112 consisting of a at least one of a cluster 500 or a storage controller (SC) function 600, each cluster 500 comprising one or more processors 501 to 506, the SC function comprising a shared cache, the shared cache being shared by processors of each cluster, the first node configured to perform a method, the method comprising: initiating (FIG. 10) 1000 communication, by each element of the configuration, to other elements of the configuration to determine configuration topology; based a result of the initiated communication, storing 1001 a coherency value 1006 by each element 109 to 112; based on the coherency value 1006, selecting 1003, by elements 109 to 112 of a node 424, a cache coherency protocol of the plurality of cache coherency protocols 1002 to be used by the node 424; and using 1004 the selected cache coherency protocol to handle cache coherency requests 1100.

In an embodiment, the configuration topology consists of the first node 424 wherein the plurality of cache coherency protocols 1002 comprise 1007 a first protocol that does not use an SC function 600 to maintain cache coherency of the node 424 and a second protocol that uses an SC function 600 to maintain cache coherency of the node first 424.

In an embodiment, the configuration topology consists of the first node 424 (FIG. 4), the using 1004 (FIG. 10) the selected cache coherency protocol further comprising accessing an inclusive directory 1005 of the SC function 600 of the first node 424 to handle the cache coherency requests.

In an embodiment, the configuration topology further comprises one or more second nodes 425 to 427, the first node 424 communicatively coupled to said one or more second nodes 425, the using 1004 the selected cache coherency protocol further comprises:

accessing 1103, by the first node 424, an inclusive directory 1005 of the SC function 600 of the first node 424 to handle the cache coherency requests;

based on determining, by the first node, that the cache coherency operation can be performed solely by the first node, performing 1102 the cache coherency operation, by the first node, without accessing caches of the one or more second nodes; and based on determining, by the first node, that the cache coherency operation must access said one or more second nodes, performing 1103 the cache coherency operation by accessing caches of said one or more second nodes.

In an embodiment, the plurality of cache coherency protocols 1007 comprise a third protocol and a fourth protocol to maintain cache coherency of the node 424 wherein the third protocol is the MESI protocol 1007 and the fourth protocol is the MOESI protocol 1007.

In an embodiment, the SC function 600 determines 1202 that one of the first protocol 1007 or second protocol 1007 is to be used in local cache coherency operations within the node and that a different one of the first protocol 1007 or second protocol 1007 is to be used in global cache coherency operations.

In an embodiment, the configuration topology comprises a plurality of nodes 424 to 431, wherein a first plurality of nodes 424, 425 are communicatively coupled by an S-Bus 406, the first plurality of nodes 424, 425 communicatively coupled to other nodes 426 to 431 of the plurality of nodes by one or more A-Buses 400 to 405 wherein coherency operations are broadcast 1203 to all nodes by way of the S-Bus 406 and the one or more A-buses 400 to 405.

Referring to FIG. 1, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A modular computer system for determining configuration topology of one or more active computer elements, the computer system comprising:

a first node of a configuration, the first node consisting of a first plurality of communicatively coupled computer elements, each element comprising a respective second plurality of first interfaces, each pair of elements of the first plurality of elements communicatively coupled by way of respective first interfaces by way of a respective point-to-point active interconnection, the respective active interconnection interconnecting only the respective pair of elements, each element being separately packaged, the second plurality of first interfaces being greater-than or equal-to the first plurality of communicatively coupled active computer elements, wherein the first plurality of elements comprises one or more clusters, wherein each element consists of any one of a cluster and a storage controller (SC) function, wherein each cluster comprises a plurality of processors, wherein each cluster is configured to communicate with 0 or more other elements based on a coherency value of the respective cluster, the SC function comprising an inclusive directory of cache lines of the first node, the inclusive directory being shared by processors of each cluster of the first node, each SC function configurable to communicate with 1 or more other elements of the first node based on the coherency value of the SC function, wherein each processor of each cluster comprises a private cache, wherein each cluster is further configured to manage cache coherency within all processor caches of the respective cluster for requests, from processors within the respective cluster, that hit in caches of the respective cluster, without interrogating caches not in the respective cluster, wherein the SC function further comprises one or more second interfaces, each second interface configured to communicate with a respective SC function of a second node, the first node configured to perform a method, said method comprising:

during system initialization of the computer system, performing, by each respective element of the first node, an operation to identify which other elements are active in the first node, the operation comprising:

determining, by each element, which first interfaces of the respective element are valid first interfaces, wherein each valid first interface of an element has only one active interconnection to only one other element of the first node, wherein each active interconnection is a point-to-point interconnection, wherein each first interface of the respective element not having an active interconnection to another element of the first node is not a valid first interface; and based on the determining, by each element, which first interfaces of the respective element are valid first interfaces, storing the coherency value by each respective element, the coherency value indicating which first interfaces of the respective element are valid interfaces and which first interfaces of the respective element are not valid interfaces; and after system initialization, during normal operation, based on the coherency value of the respective cluster, broadcasting, by the respective cluster, cache line fetches to all other active elements of the first node by way of valid interfaces of the respective cluster, the cache line fetches being cache line fetches for cache lines that miss in all caches of the respective cluster, and after system initialization, during normal operation, using, by each element, the respective stored coherency value, of the respective element, to determine which other elements of the first node are to be accessed in the first node.

2. The modular computer system according to claim 1, wherein each cluster is further configured to manage cache coherency within all processor caches of a respective cluster for requests, from processors within the respective cluster that hit in caches of the respective cluster, without interrogating caches not in the respective cluster, wherein each cluster is configured to fetch all cache lines that miss in the single cluster directly from memory, without checking or waiting for resource availability of any other cluster or SC function, based on a coherency value of the single cluster being a coherency value of a configuration consisting of only the single cluster and no SC function, wherein each cluster is configured to broadcast cache line fetches that miss in all caches of a respective cluster to all other clusters of the configuration by way of respective active first interfaces, without checking or waiting for resource availability of an SC function, based on a coherency value being a coherency value of a configuration consisting of a plurality of clusters and no SC function.

3. The modular computer system according to claim 1, wherein based on the coherency value being a coherency value of an SC function of the first node having at least one second interface connected to another SC function of the second node, providing, by respective clusters of a respective node, a local point of coherency for cache lines within the respective node, and providing, by SC functions of each node, a global point of coherency for cache lines of all nodes of the configuration.

4. The modular computer system according to claim 1, wherein each respective element of the configuration of a plurality of elements is configured to broadcast a request for a cache line to elements other than the requesting element of the configuration, the request consisting of a command and an address, wherein each element receiving the broadcast request is configured to create a respective partial response (PRESP) based on respective state of the requested cache line in the respective element, and to send the respective partial response (PRESP) to all elements other than the respective element, wherein each element is configured to form a combined response (CRESP) based on PRESPs, wherein one of the elements of the configuration is established as the point of coherency for the requested cache line, wherein the method further comprises:

broadcasting a request for a cache line to elements other than the requesting element of the configuration, the request consisting of a command and an address;

creating by each respective element receiving the broadcast request a respective partial response (PRESP) based on respective state of the requested cache line in the respective element;

sending the respective partial response (PRESP) to all elements other than the respective element; and forming a combined response (CRESP), by all elements, based on PRESPs, wherein one of the elements of the configuration is established as the point of coherency for the requested cache line.

5. The modular computer system according to claim 1, wherein each respective cluster further comprises a shared cache, shared by all processors of the respective cluster, wherein the broadcast cache line fetches of the respective cluster are cache line fetches for cache lines that miss in the shared cache of the respective cluster.

6. The modular computer system according to claim 5, wherein the shared cache comprises a shared cache controller that provides an element to element communication coherency protocol and mechanism, wherein the determining which first interfaces of a respective cluster are valid first interfaces is performed by the shared cache controller of the respective cluster.

7. The modular computer system according to claim 1, further comprising:

based on the respective cluster broadcasting a cache line fetch for a specified cache line, receiving, by the each element of the first node, a partial response from each other element of the first node, each partial response indicating a state of the specified cache line in the respective other element; and establishing a local point of coherency, by one cluster of the first node, based on the received partial responses.

8. The modular computer system according to claim 1, wherein the performing the operation, by a respective element, to identify which other elements are active in the configuration is performed by firmware of the respective element, wherein the performing the operation further comprises determining, by the SC function, whether the node of the SC function includes other clusters and whether the node of the SC function is communicatively coupled to other nodes, wherein each cluster is configured to broadcast cache line fetches for cache lines that miss in all caches of a respective cluster to all other clusters and an SC function of the configuration by way of respective active first interfaces, wherein the SC function is configured to use the inclusive cache directory to provide, to each cluster, state information about a target cache line of the broadcast cache line fetch based on the coherency value being a coherency value of a cluster having at least one first interface connected by an active interconnection to another cluster and at least one first interface connected by an active interconnection to the SC function, wherein after system initialization, during normal operation, the method further comprises, based on the coherency value being a coherency value of a cluster having at least one first interface connected by an active interconnection to another cluster and at least one first interface connected by an active interconnection to an SC function, broadcasting cache line fetches for cache lines that miss in all caches of a respective cluster to all other clusters and the SC function of the configuration by way of respective active first interfaces; and using, by the SC function, an inclusive cache directory to provide, to each cluster, state information about a target cache line of the broadcast cache line fetch.

9. The modular computer system according to claim 1, wherein the first plurality of communicatively coupled elements is 4, wherein 6 respective pairs of the 4 elements are communicatively coupled by 6 active interfaces.

10. The modular computer system according to claim 1, wherein the determining which first interfaces of the respective element are valid first interfaces, consists of any one of transmitting signals over respective element interfaces and calibrating respective element interfaces for element to element communication, the calibrating comprising setting a status bit to indicate the respective element interface is valid.

11. A computer program product for determining configuration topology of one or more active computer elements in a modular computer system comprising a first node of a configuration, the first node consisting of a first plurality of communicatively coupled computer elements, each element comprising a respective second plurality of first interfaces, each pair of elements of the first plurality of elements communicatively coupled by way of respective first interfaces by way of a respective point-to-point active interconnection, the respective active interconnection interconnecting only the respective pair of elements, each element being separately packaged, the second plurality of first interfaces being greater-than or equal-to the first plurality of communicatively coupled active computer elements, wherein the first plurality of elements comprises one or more clusters, wherein each element consists of any one of a cluster and a storage controller (SC) function, wherein each cluster comprises a plurality of processors, wherein each cluster is configured to communicate with 0 or more other elements based on a coherency value of the respective cluster, the SC function comprising an inclusive directory of cache lines of the first node, the inclusive directory being shared by processors of each cluster of the first node, each SC function configurable to communicate with 1 or more other elements of the first node based on the coherency value of the SC function, wherein each processor of each cluster comprises a private cache, wherein each cluster is further configured to manage cache coherency within all processor caches of the respective cluster for requests, from processors within the respective cluster, that hit in caches of the respective cluster, without interrogating caches not in the respective cluster, wherein the SC function further comprises one or more second interfaces, each second interface configured to communicate with a respective SC function of a second node, the computer program product comprising:

a computer readable storage medium readable by a processing circuit and storing instructions for execution by the processing circuit for performing a method comprising:

during system initialization of the computer system, performing, by each respective element of the first node, an operation to identify which other elements are active in the first node, the operation comprising:

determining, by each element, which first interfaces of the respective element are valid first interfaces, wherein each valid first interface of an element has only one active interconnection to only one other element of the first node, wherein each active interconnection is a point-to-point interconnection, wherein each first interface of the respective element not having an active interconnection to another element of the first node is not a valid first interface; and based on the determining, by each element, which first interfaces of the respective element are valid first interfaces, storing the coherency value by each respective element, the coherency value indicating which first interfaces of the respective element are valid interfaces and which first interfaces of the respective element are not valid interfaces; and after system initialization, during normal operation, based on the coherency value of the respective cluster, broadcasting, by the respective cluster, cache line fetches to all other active elements of the first node by way of valid interfaces of the respective cluster, the cache line fetches being cache line fetches for cache lines that miss in all caches of the respective cluster, and after system initialization, during normal operation, using by each element the respective stored coherency value, of the respective element, to determine which other elements of the first node are to be accessed in the first node.

12. The computer program product according to claim 11, wherein each cluster is further configured to manage cache coherency within all processor caches of a respective cluster for requests, from processors within the respective cluster that hit in caches of the respective cluster, without interrogating caches not in the respective cluster, wherein each cluster is configured to fetch all cache lines that miss in the single cluster directly from memory, without checking or waiting for resource availability of any other cluster or SC function, based on a coherency value of the single cluster being a coherency value of a configuration consisting of only the single cluster and no SC function, wherein each cluster is configured to broadcast cache line fetches that miss in all caches of a respective cluster to all other clusters of the configuration by way of respective active first interfaces, without checking or waiting for resource availability of an SC function, based on a coherency value being a coherency value of a configuration consisting of a plurality of clusters and no SC function.

13. The computer program product according to claim 11, wherein based on the coherency value being a coherency value of an SC function of the first node having at least one second interface connected to another SC function of a second node, providing, by respective clusters of a respective node, a local point of coherency for cache lines within the respective node, and providing, by SC functions of each node, a global point of coherency for cache lines of all nodes of the configuration.

14. The computer program product according to claim 11, wherein each respective element of the configuration of a plurality of elements is configured to broadcast a request for a cache line to elements other than the requesting element of the configuration, the request consisting of a command and an address, wherein each element receiving the broadcast request is configured to create a respective partial response (PRESP) based on respective state of the requested cache line in the respective element, and to send the respective partial response (PRESP) to all elements other than the respective element, wherein each element is configured to form a combined response (CRESP) based on PRESPs, wherein one of the elements of the configuration is established as the point of coherency for the requested cache line, the method further comprises:

broadcasting a request for a cache line to elements other than the requesting element of the configuration, the request consisting of a command and an address;

creating by each respective element receiving the broadcast request a respective partial response (PRESP) based on respective state of the requested cache line in the respective element;

sending the respective partial response (PRESP) to all elements other than the respective element; and forming a combined response (CRESP), by all elements, based on PRESPs, wherein one of the elements of the configuration is established as the point of coherency for the requested cache line.

15. The computer program product according to claim 11, wherein each respective cluster further comprises a shared cache, shared by all processors of the respective cluster, wherein the broadcast cache line fetches of the respective cluster are cache line fetches for cache lines that miss in the shared cache of the respective cluster.

16. The computer program product according to claim 15, wherein the shared cache comprises a shared cache controller that provides an element to element communication coherency protocol and mechanism, wherein the determining which first interfaces of a respective cluster are valid first interfaces is performed by the shared cache controller of the respective cluster.

17. The computer program product according to claim 11, further comprising:

based on the respective cluster broadcasting a cache line fetch for a specified cache line, receiving, by the each element of the first node, a partial response from each other element of the first node, each partial response indicating a state of the specified cache line in the respective other element; and establishing a local point of coherency, by one cluster of the first node, based on the received partial responses.

18. The computer program product according to claim 11, wherein the performing the operation, by a respective element, to identify which other elements are active in the configuration is performed by firmware of the respective element, wherein the performing the operation further comprises determining, by the SC function, whether the node of the SC function includes other clusters and whether the node of the SC function is communicatively coupled to other nodes, wherein each cluster is configured to broadcast cache line fetches for cache lines that miss in all caches of a respective cluster to all other clusters and an SC function of the configuration by way of respective active first interfaces, wherein the SC function is configured to use the inclusive cache directory to provide, to each cluster, state information about a target cache line of the broadcast cache line fetch based on the coherency value being a coherency value of a cluster having at least one first interface connected by an active interconnection to another cluster and at least one first interface connected by an active interconnection to the SC function, wherein after system initialization, during normal operation, the method further comprises, based on the coherency value being a coherency value of a cluster having at least one first interface connected by an active interconnection to another cluster and at least one first interface connected by an active interconnection to an SC function, broadcasting cache line fetches for cache lines that miss in all caches of a respective cluster to all other clusters and the SC function of the configuration by way of respective active first interfaces; and using, by the SC function, an inclusive cache directory to provide, to each cluster, state information about a target cache line of the broadcast cache line fetch.

19. The computer program product according to claim 11, wherein the first plurality of communicatively coupled elements is 4, wherein 6 respective pairs of the 4 elements are communicatively coupled by 6 active interfaces.

20. The computer program product according to claim 11, wherein the determining which first interfaces of the respective element are valid first interfaces, consists of any one of transmitting signals over respective element interfaces and calibrating respective element interfaces for element to element communication, the calibrating comprising setting a status bit to indicate the respective element interface is valid.

* * * * *